3,030,421
PROCESS FOR PREPARING TRIHYDROXY-METHYL-PHOSPHINE

Martin Reuter and Ludwig Orthner, Frankfurt am Main, Germany, assignors to Farbwerke Hoechst Aktiengesellschaft vormals Meister Lucius & Brüning, Frankfurt am Main, Germany, a corporation of Germany
No Drawing. Filed Jan. 14, 1958, Ser. No. 708,764
Claims priority, application Germany Jan. 23, 1957
6 Claims. (Cl. 260—606.5)

We have found that a new and valuable phosphorus compound carrying hydroxymethyl groups at the phosphorus atom can be prepared by reacting 1 mol of formaldehyde with ⅓ mol of phosphine, preferably in the presence of water, and in the presence of small quantities of finely distributed metals that do not belong to the alkali metals or alkaline earth metals and/or their compounds which may react with phosphine, and/or of their phosphine reaction products. The product obtained in this reaction presumably constitutes the hitherto unknown trihydroxymethyl-phosphine.

The same compound can be obtained by reacting 1 mol of tetra-hydroxymethyl-phosphonium hydroxide obtainable from phosphine and 4 mols of formaldehyde with ⅓ mol of phosphine, preferably in the presence of water, and in the presence of the aforementioned catalysts.

The metals or the compounds or phosphine reaction products derived therefrom which are effective in the process of the present invention are principally the central or terminal members of the metal groups of the periodic table, as set forth for example in "Handbook of Chemistry and Physics," 39th Edition (1957), pages 400–401, preferably the members of the 2nd and 8th group. Especially well suitable are for example the salts such as chlorides, sulfates, nitrates, phosphates and those of other inorganic acids, double salts, basic salts, salts of organic acids such as formates, acetates, benzoates, salicylates etc., hydroxides, complex salts and oxides, as far as they can be reacted with phosphine, of cadmium, mercury, iron, cobalt, rhodium, palladium. Somewhat less suitable are, for example, compounds of metals or metalloids of the 3rd group of the periodic table, such as aluminum chloride or hydrofluoboric acid. Simple and complex platinum salts and hydroxides are particularly well suitable. In certain circumstances these metals may also be used in a finely divided, for example colloidal form, and/or on carriers.

The exothermic reaction takes place advantageously in the presence of water, if desired with addition of watersoluble organic solvents such as low aliphatic alcohols or cyclic ethers, for example ethanol or dioxane, at a normal, slightly reduced or elevated temperature, that is to say between about $-10°$ C. and $+40°$ C., while stirring as intensely as possible in order to achieve a good distribution of the introduced phosphine. If desired, the operation can be carried out under pressure.

The pH-value of the mixture from formaldehyde, which may also be used in a polymeric form, and catalyst amounts to about 8.5 at the beginning of the reaction and falls to about 7 at the end of the phosphine action. If at first a phosphonium hydroxide is formed with ¼ mol of phosphine, a further ¹⁄₁₂ mol of phosphine can directly be introduced with or without further addition of the catalyst according to the efficiency of the metals, altogether ⅓ mol of phosphine per mol of the formaldehyde used.

After the reaction the catalyst, which is mostly suspended and sometimes also dissolved in colloidal form, is filtered off, in many cases advantageously with addition of animal charcoal or kieselguhr. As far as the operation is carried out in the presence of solvents, the latter can be distilled off, preferably at a slightly raised temperature and under a reduced pressure. In the case of most of the catalysts the reaction products, which are free from solvents, solidify already when being cooled to room temperature. If, in the case of some catalysts, they solidify only at a lower temperature and still contain to a greater extent oily by-products and/or phosphonium hydroxide, they can be separated from the latter by filtering or pressing.

It is to be assumed that the crystalline main product of the present invention constitutes the hitherto unknown trihydroxymethyl-phosphine. Main and by-products are easily soluble in water and methanol and sparingly soluble in fat dissolvers.

The reaction products of the invention can be used as insecticides, additives for lubricants, flame-proofing agents for wood and textiles and as intermediates for these substances.

The following examples serve to illustrate the invention but they are not intended to limit it thereto:

Example 1

0.5 gram of platinum(IV) hydroxide or platinum(II) or IV chloride or potassium platinum(II) chloride is dissolved in 300 grams of a formaldehyde solution of 30% strength (3 mols) and there are then introduced in the course of 5 hours and at a temperature of about $-3$ to $-5°$ C. 35 grams of phosphine (1.03 mols). The phosphine is almost completely absorbed.

The reaction takes place at first with development of a strong and then of a slight reaction heat. With ¾ mol of phosphine the quaternary phosphonium hydroxide is formed which imparts a pH-value of about 8.5 to the solution.

The almost neutral reaction solution (pH—about 6.5) which is at first turbid but finally almost clear is filtered and evaporated to dryness at about 40° C. and under reduced pressure.

As reaction product there are obtained 123 grams (99% of the theoretical yield) of an organic phosphorus compound in the form of an oily residue, which, on cooling, solidifies to form a wax-like substance (solidification point: about 52° C.). The wax is easily soluble in water, methanol and ethanol, pyridine, dimethyl-formamide and trimethyl-phosphate and can be recrystallized (melting point: 58° C.) at a moderate temperature from acetone or a little isopropanol, advantageously with exclusion of air of addition of an inhibitor (for example 1% of hydroquinone). It is insoluble in ether, ethyl acetate, benzene, petroleum ether, acetonitrile and tributyl phosphate.

The same result is obtained at a reaction temperature of about 30° C., while the platinum salt may be replaced by 1 gram of rhodium(III) chloride or cadmium chloride. If 1 gram of mercury(II) chloride, palladium(II) chloride, cobalt(III) chloride or iron(III) chloride is used, there must be added after absorption of ¾ mol of phosphine a further gram of these salts in order to reactivate the phosphine absorption. The same applies to aluminum chloride or hydrofluoboric acid, the yield of the crystalline product being, however, smaller.

It is also possible to add preformed reaction products from metal compounds and phosphine to the formaldehyde. Thus, phosphine can for example be introduced into an aqueous solution of 20% strength of 1 gram of cadmium chloride which had been adjusted to a pH-value of about 8 by means of a little ammonia. The whitish turbid solution obtained is added to the formaldehyde solution.

The reaction product can be distilled under reduced pressure with partial decomposition (boiling point 115° C. at a pressure of 2.5 mm.). The elementary analysis corresponds to the formula of the still unknown trihydroxymethyl-phosphine $(HOCH_2)_3P$ (found: 28.5% C, 1% H, 24.3% P; calculated: 29.0% C, 7.3% H, 25.0% P).

The new phosphorus compound reacts with benzoquinone in alcoholic solution with evolution of heat to form a yellow addition product (melting point: 160° C., analysis: 13.2% P; for $(HOCH_2)_3P \cdot C_6H_4O_2$ (molecular weight: 232) calculated 13.4% P). In alcoholic solution it yields with mercury(II) chloride a white complex which is insoluble in water and in organic solvents (melting point: 135° C.) and has the analytical composition $(CH_2OH)_3P \cdot HgCl_2$ which confirms the above constitution of the new phosphorus compound.

During the reaction with hydroxylamine hydrochloride in an aqueous solution about 1 mol of hydrochloric acid is slowly formed which suggests a somewhat loose linkage of one hydroxy-methyl group.

Example 2

Into a mixture of 200 grams of a formaldehyde solution (2 mols) and 160 grams of methanol, in which 0.5 gram of platinum(IV) chloride is dissolved, there are introduced through a frit at 0° C. and in the course of 8 hours, while stirring, 23 grams of phosphine (0.67 mol). The phosphine is almost completely absorbed. The neutral reaction solution is purified from traces of insoluble constituents by filtration and then evaporated to dryness under reduced pressure. There are obtained as residue 79 grams of a weakly yellowish oil that solidifies upon inoculation (melting point: 51° C.) and proves identical in the mixed melting point with the trihydroxymethyl-phosphine obtained according to Example 1.

By using, instead of methanol, the same quantity of isopropanol, acetonitrile or dimethyl-formamide or, instead of the formaldehyde solution of 30% strength, an equivalent quantity of a formaldehyde solution of 40% strength, and otherwise working in the manner described above, the same result is obtained.

Example 3

Into a suspension of 90 grams of para-formaldehyde in 200 cc. of acetonitrile, in which 0.5 gram of platinum(IV) chloride is dissolved, there are introduced through a frit, while stirring, 35 grams of phosphine. The temperature rises from 20° C. to 35° C. and the paraformaldehyde dissolves, whereby an emulsion-like mixture of oily tri-hydroxymethyl-phosphine (underlayer) in acetonitrile is formed. This mixture is inoculated, while stirring, with a little crystalline tri-hydroxymethyl-phosphine, whereupon the oily tri-hydroxymethyl-phosphine solidifies. After filtering off with suction and drying under reduced pressure, there are obtained 120 grams of pure tri-hydroxymethyl-phosphine.

By suspending the paraformaldehyde in a mixture of 100 grams of water and 100 grams of acetonitrile instead of in 200 grams of acetonitrile, a clear reaction solution is obtained when phosphinating in the same manner. On evaporation under reduced pressure, this reaction solution yields 124 grams of pure tri-hydroxymethyl-phosphine melting at 57° C.

Instead of paraformaldehyde there may also be used the same quantity of trimeric cyclic formaldehyde (trioxane; cf. Ind. Eng. Chem., volume 39, page 974).

Example 4

More concentrated solutions of tri-hydroxymethyl-phosphine in water are obtained in the following manner:

In the reaction solution described in Example 1 there are suspended 180 grams of paraformaldehyde (6 mols) and, while stirring, there are introduced at about 30° C. to 40° C. 68 grams of phosphine (2 mols). Finally, a clear, viscous solution of about 65% strength of tri-hydroxymethyl-phosphine is obtained which, when evaporated under reduced pressure, yields 370 grams of pure tri-hydroxymethyl-phosphine melting at 57° C.

The content can be determined in an hydrochloric acid medium by addition of an excess of 1/10 N-iodine solution and back titration with 1/10 N-thiosulfate solution, 1 mol of tri-hydroxymethyl-phosphine using up 2 atoms of iodine. It was found that in an hydrochloric acid medium formaldehyde does not use up any iodine at all and that tetra-hydroxymethyl-phosphonium chloride uses up only about 0.1 iodine atom per phosphorus atom.

Example 5

Into a solution of 172 grams of tetra-hydroxymethyl-phosphonium hydroxide in 262 grams of water obtained, as described in copending application Serial No. 707,475, filed January 7, 1958, from 400 grams of a formaldehyde solution of 30% strength and 34 grams of phosphine in the presence of suspended silver hydroxide, there are introduced, after addition of 0.3 gram of platinum(IV) chloride, through a frit, within 3 hours and at about 30° C., while stirring, 11.3 grams of phosphine. The phosphine is easily absorbed with a weakly exothermic reaction while the pH-value of the reaction mixture falls from about 8.5 to about 6.3. On working up according to Example 1 there are obtained 165 grams of crystalline tri-hydroxymethyl-phosphine (melting point: 53° C.).

The introduction of the phosphine into the aqueous solution of the tetra-hydroxymethyl-phosphonium hydroxide can be effected with the same success on the bottom of a column from the head of which the pumped up solution trickles down over filling bodies.

For the reaction with the phosphine there may also be used a methanolic or ethanolic solution of 172 grams of tetra-hydroxymethyl-phosphonium hydroxide which is obtained from 191 grams of tetra-hydroxymethyl phosphonium chloride dissolved in 400 cc. of methanol or 600 cc. of ethanol by reaction with a solution of 10% strength of 54 grams of sodium methylate or 40 grams of sodium hydroxide in 400 cc. of ethanol and filtering off the sodium chloride that has separated.

We claim:

1. The process of preparing trihydroxymethylphosphine which comprises reacting a compound of the group consisting of formaldehyde and tetrahydroxymethylphosphonium hydroxide with phosphine, in a molar ratio of about 3:1, in the presence of a small quantity of a finely distributed substance of the group consisting of (a) soluble halides, sulfates, nitrates, hydroxides, oxides, complex halides, phosphates, formates, acetates, benzoates and salicylates of cadmium, mercury, aluminum, silver and metals of group VIII of the periodic system, (b) phosphine reaction products of the compounds specified under (a), (c) mixtures of the compounds mentioned under (a) and (b), and (d) hydrofluoboric acid.

2. The process as defined in claim 1 wherein the reaction is carried out in the presence of a soluble compound of platinum.

3. The process as defined in claim 1 wherein the reaction is carried out in the presence of a soluble compound of cadmium.

4. The process as claimed in claim 1, wherein said reaction is carried out in the presence of water.

5. The process as claimed in claim 1, wherein the reaction is carried out at a temperature between −10° C. and +40° C.

6. The process as claimed in claim 1, wherein the reaction is carried out at pH-values between about 8.5 and about 6.

References Cited in the file of this patent

UNITED STATES PATENTS 2,803,597 Stiles _____ Aug. 20, 1957